Feb. 19, 1929.

L. F. HOWARD 1,702,543

BEARING STRUCTURE

Filed April 29, 1927

INVENTOR:
L. F. Howard,
by A. R. Vencill
His attorney

Patented Feb. 19, 1929.

1,702,543

UNITED STATES PATENT OFFICE.

LEMUEL F. HOWARD, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

BEARING STRUCTURE.

Application filed April 29, 1927. Serial No. 187,512.

My invention relates to bearing structures. Bearings embodying my invention are particularly suitable for, though in no way limited to use in railway car retarder systems in which the bearings provide fixed abutments against which the stresses of the braking forces may be exerted.

I will describe one form of bearing structure embodying my invention, and will then point out the novel features thereof in claims.

Figure 1:
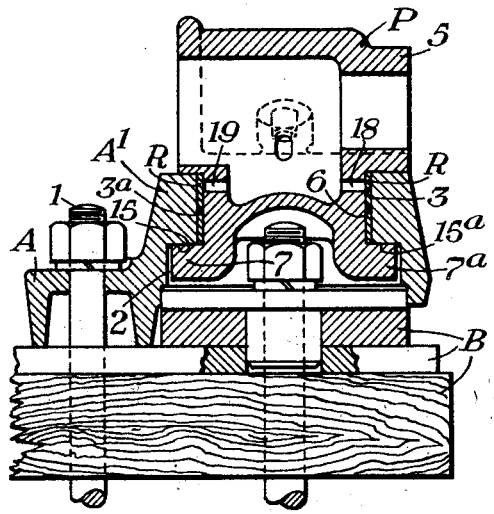
Figure 2:
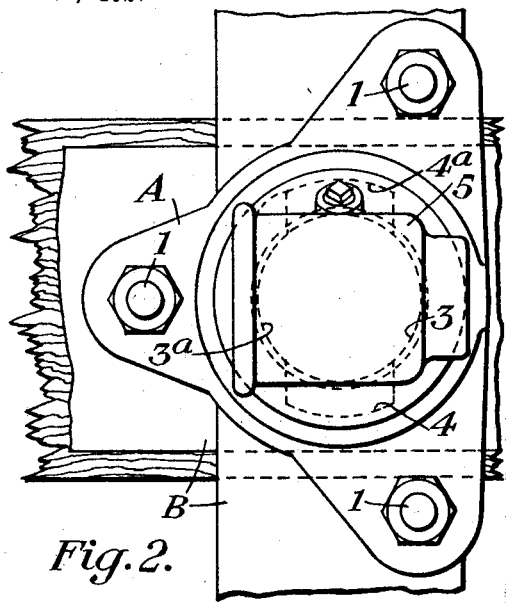
Figure 3:
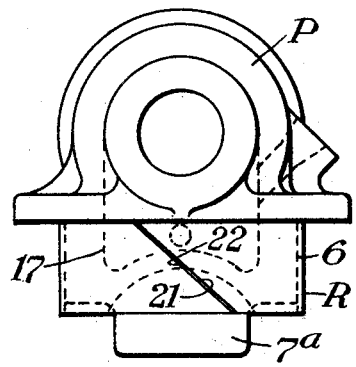
Figure 4:
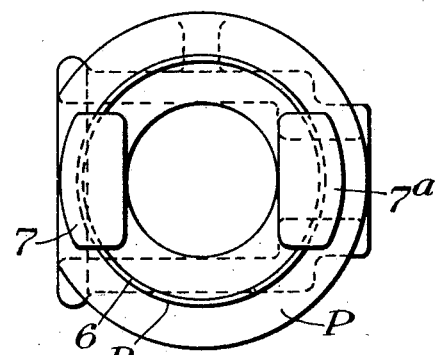
Figure 5:
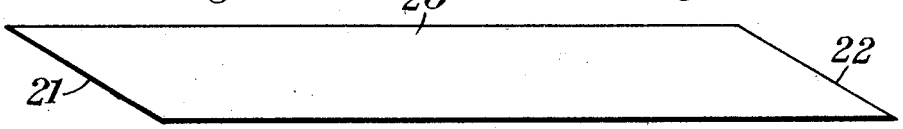
Figure 6:
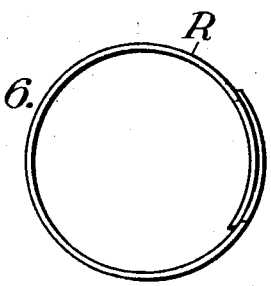
Figure 7:
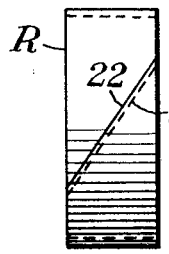

In the accompanying drawing, Fig. 1 is a view showing in vertical cross section, one form of bearing structure embodying my invention. Fig. 2 is a top plan view of the bearing structure shown in Fig. 1. Figs. 3 and 4 are views showing in elevation and bottom plan respectively, a portion of the bearing structure illustrated in Figs. 1 and 2. Fig. 5 is a view showing one part of the bearing structure illustrated in the preceding views at one stage in its manufacture. Figs. 6 and 7 are a top and side view, respectively of the part shown in Fig. 5 in its completed form.

Similar reference characters refer to similar parts in each of the several views.

Referring first to Figs. 1 and 2, the bearing structure comprises a stationary base member designated by the reference character A and rigidly attached, by bolts 1, to a suitable foundation designated in general by the reference character B. Upstanding from the top face of the base member A is a conical portion $A^1$ the interior of which is provided with two confronting semi-cylindrical bearing faces 3 and $3^a$, separated by vertical flutes 4 and $4^a$. Supported by the member A is a movable post designated in general by the reference character P and comprising a head 5 and a cylindrical shank 6 provided at its lower extremity with outstanding locking wings 7 and $7^a$. The locking wings 7 and $7^a$ are proportioned to enter the flutes 4 and $4^a$ in the stationary member A so that by inserting the post in the stationary member and then rotating the post about the axis of the shank 6, the parts may be locked to prevent vertical displacement of the post from the stationary member while permitting the post to rotate freely. The head 5 of the post P may be connected in any suitable manner with movable parts not shown in the drawing.

With the apparatus thus far described, it will be seen that the semi-cylindrical bearing surfaces 3 and $3^a$ of the stationary member A support the shank 6 of the movable post P while permitting rotation of this post about the axis of the shank 6. Bearing structures of the type described are sometimes subjected to comparatively large stresses in a direction at right angles to the axis of shank 6 of post P. As a result a considerable pressure is developed to create friction between the post and the stationary member. In my invention I prefer to provide a bearing ring R of anti-friction material between the shank 6 and the bearing surfaces 3 and $3^a$ of the stationary member A. This bearing ring will sustain the major portion of the wear developed in the bearing structure and it is therefore desirable that the ring should be easily removed and replaced. A circumferentially continuous ring could not be used because a ring of this type could not pass over the outstanding locking wings 7 and $7^a$. I therefore propose to construct the bearing ring in a manner which I will now describe. Referring first to Fig. 5, a flat strip 20 of resilient anti-friction material such, for example, as hard phosphor bronze, is provided with its edges 21 and 22 trimmed at an angle to the long dimension of the strip. The strip 20 is then rolled into the ring R as shown in Figs. 6 and 7 with the edges 21 and 22 overlapping slightly as best shown in Fig. 7. The ring R is so proportioned that its internal diameter when thus formed, is slightly less than the diameter of the shank 6 of the post P. The ring R constructed as just described, is placed upon the shank 6 of the post P by expanding the ring and snapping it over the projecting locking wings 7 and $7^a$ of the movable post P. Due to the natural resiliency of the ring R, the ring will tend to return to its original shape, thereby snugly embracing the shank of the post, and assuming the condition in which it is illustrated in Figs. 3 and 4, that is, with the edges 21 and 22 of the ring spaced slightly apart and the ring held securely in place on the shank 6 by the resiliency of the ring.

The post P with the bearing ring R in position may then be inserted in the stationary member A by turning the post so that locking wings 7 and $7^a$ enter the flutes 4 and $4^a$ in the stationary member. When the post has been inserted far enough for the locking wings to clear the undersides of the shoulders 15 and 15ª, the post may be rotated slightly about the axis of the shank 6, whereby the post will be locked in position to prevent relative motion of the post and member A in a direction parallel to the axis of the shank 6 of the post. In this position rotation of the post with respect to the member A is readily possible and the bearing ring R reduces the friction between the shank 6 and the bearing surfaces 3 and 3ª to a very small value.

It should be observed that with bearing structures embodying my invention if the bearing ring becomes worn it may be replaced by simply expanding the ring and snapping it off of the post and substituting a new bearing ring.

Although I have herein shown and described only one form of bearing structure embodying my invention, it is understood that various changes and modifications may be made therein within the scope of the appended claims without departing from the spirit and scope of my invention.

Having thus described my invention, what I claim is:

1. In a bearing structure, the combination of a post having a cylindrical shank of smaller diameter than the adjacent portions of the post, a split ring of resilient anti-friction material snugly embracing said shank and removable therefrom by expanding the ring to pass over an adjacent portion of the post, and a stationary bearing member co-operating with the outside surface of said ring.

2. In a bearing structure, the combination of a movable post having a head and a cylindrical shank provided with an outstanding locking wing, a split bearing ring of resilient anti-friction material snugly embracing the shank and removable therefrom by expanding the ring to pass over said wing, and a stationary member provided with a semi-cylindrical bearing face co-operating with the bearing ring and a flute in the stationary member extending through said bearing surface through which the locking wing may pass to permit movement of the shank into and out of the stationary member.

3. In a bearing structure the combination of a stationary bearing member provided on its interior with two confronting semi-cylindrical bearing faces separated by vertically extending flutes, a movable post having a head and a cylindrical shank with outstanding locking wings, and a diagonally split bearing ring snugly embracing the shank and expandible to move the ring over the locking wings, the flutes on the stationary member receiving the locking wings on the post so that the bearing ring on the shank engages the cylindrical surfaces of the stationary member.

In testimony whereof I affix my signature.

LEMUEL F. HOWARD.